(12) United States Patent
Dayan

(10) Patent No.: US 9,285,943 B2
(45) Date of Patent: Mar. 15, 2016

(54) GRAPHIC-BASED ELECTRONIC SIGNATURE MANAGEMENT SYSTEM AND METHOD

(76) Inventor: Jacob J. Dayan, Neptune, NJ (US)

( * ) Notice: Subject to any disclaimer, the term of this patent is extended or adjusted under 35 U.S.C. 154(b) by 0 days.

(21) Appl. No.: 13/340,491

(22) Filed: Dec. 29, 2011

(65) Prior Publication Data

US 2013/0174065 A1 Jul. 4, 2013

(51) Int. Cl.
*G06F 3/048* (2013.01)
(52) U.S. Cl.
CPC ..................................... *G06F 3/048* (2013.01)
(58) Field of Classification Search
CPC ...................................................... G06F 3/048
USPC ............................................................ 715/763
See application file for complete search history.

(56) References Cited

U.S. PATENT DOCUMENTS

| | | | |
|---|---|---|---|
| 5,909,687 A | 6/1999 | Tapper | |
| 6,873,861 B2 | 3/2005 | Awada et al. | |
| 7,246,099 B2 | 7/2007 | Feldhahn | |
| 7,753,260 B2 | 7/2010 | Kanatani et al. | |
| 7,974,877 B2 | 7/2011 | Ramanathan et al. | |
| 8,677,256 B2 | 3/2014 | Dayan | |
| 2005/0091074 A1* | 4/2005 | Feldhahn | 705/1 |
| 2005/0103838 A1 | 5/2005 | Slotkin et al. | |
| 2005/0182644 A1 | 8/2005 | Douvikas et al. | |
| 2005/0251448 A1 | 11/2005 | Gropper | |
| 2006/0075050 A1 | 4/2006 | Kanatani et al. | |
| 2006/0293904 A1 | 12/2006 | Ramanathan et al. | |
| 2006/0293905 A1* | 12/2006 | Ramanathan et al. | 705/1 |
| 2007/0265985 A1 | 11/2007 | Feldhahn | |
| 2009/0019376 A1* | 1/2009 | Quillen et al. | 715/753 |
| 2009/0049070 A1 | 2/2009 | Steinberg | |
| 2009/0049389 A1 | 2/2009 | Kuzmanovic | |
| 2010/0077302 A1 | 3/2010 | Bostrom et al. | |
| 2010/0088105 A1 | 4/2010 | Feldhahn | |
| 2010/0205545 A1* | 8/2010 | Dawson | G06Q 10/107 715/758 |
| 2010/0306659 A1 | 12/2010 | Shahine et al. | |

(Continued)

FOREIGN PATENT DOCUMENTS

| | | |
|---|---|---|
| KR | 20020074236 A | 9/2002 |
| KR | 1020090025531 A | 3/2009 |
| WO | 2010122429 A2 | 10/2010 |

OTHER PUBLICATIONS

R. Tankelevich et al. "Electronic Virtual Stamps: A New Paradigm in Internet Communication" Conference Proceedings of the 2008 International Conference on Internet Computing, ICOMP 2008, Jul. 14-17, 2008.*

(Continued)

*Primary Examiner* — Jennifer To
*Assistant Examiner* — Xuyang Xia
(74) *Attorney, Agent, or Firm* — Avyno Law P.C.

(57) ABSTRACT

A computer-implemented system for managing an electronic signature is provided. A data collector receives one or more contact information items. A signature builder builds a graphic-based electronic signature based on at least one of the contact information items. The graphic-based electronic signature includes a set of icons. Individual icons in the set of icons are respectively associated with at least one of the contact information items. Individual icons in the set of icons are configured to initiate a communication application when one of the icons is selected in order to communication via the communication application using the contact information item associated with the selected icon.

20 Claims, 9 Drawing Sheets

(56) References Cited

U.S. PATENT DOCUMENTS

| | | | |
|---|---|---|---|
| 2011/0078729 A1* | 3/2011 | LaJoie et al. | 725/36 |
| 2011/0145049 A1 | 6/2011 | Hertel et al. | |
| 2011/0173298 A1 | 7/2011 | Nam | |
| 2012/0009036 A1 | 1/2012 | Marcos et al. | |
| 2012/0016939 A1 | 1/2012 | Cheah | |
| 2012/0087537 A1 | 4/2012 | Liu et al. | |
| 2012/0150970 A1* | 6/2012 | Peterson et al. | 709/206 |
| 2012/0290601 A1 | 11/2012 | Huang | |
| 2013/0031193 A1 | 1/2013 | Cheah | |
| 2013/0060867 A1 | 3/2013 | Davis et al. | |
| 2013/0061119 A1* | 3/2013 | Jackson | 715/206 |

OTHER PUBLICATIONS

Microsoft; Working screenshot of Outlook 2007 manufactured by Microsoft; released on Jan. 2007; 28 pp.

"Clickable social media Icons in your OS X Mail.app.signature"; Dec. 1, 2009; retrieved from the Internet on Jun. 18, 2015: URL: https://www.youtube.com/watch?v=p025YE-g2eM.

"Social Media Clickable Icons in Mail Signature"; Mar. 11, 2010; retrieved from the Internet on Jun. 18, 2015: URL: https://www.youtube.com/watch?v=Er6ZvV8Ka-Q.

"How to Put Social Media Icons in Your Email Signature"; Jan. 12, 2011; retrieved from the Internet on Jun. 18, 2015: URL: https://www.youtube.com/watch?v=7QgLiflguic.

* cited by examiner

FIG. 3

```html
<span style='font-size: medium;'><strong>Bob Cobb</strong></span>
<br />
<span style='color:black;'><em>Executive Chef</em></span>
<span style='color:black;'><em>, </em></span>
<span style='color:black;'><em>Brown Derby Hotel (Los Angeles)</em></span>
<br />
<table cellpadding='1' cellspacing='0'>
        <tr>
                <td>
                        <a href='http://www.sigbop.com/Vcard.aspx?ButtonId=509637de-a8d2-4c2c-a93f-
                        11a8ba388735'>

<img alt='Bob Cobb' src='http://www.sigbop.com/Images/Buttons/VCARD.png' border='0'
                                height='32' width='32' style='padding-right:3px;' >

</a>
                </td>
                <td>
                        <a href='mailto:bcobb@bdh.com'>
                                <img alt='bcobb@bdh.com'
                                src='http://www.sigbop.com/Images/Buttons/PRIMARYEMAIL.png' border='0' height='32'
                                width='32' style='padding-right:3px;'>
                        </a>
                </td>
                <td>
                        <a href=tel:'+1-(123)-555-1234'>
                                <img alt='tel:+1-(123)-555-1234'
                                src='http://www.sigbop.com/Images/Buttons/WORKPHONE.png' border='0' height='32'
                                width='32' style='padding-right:3px;' >
                        </a>
                </td>
                <td>
                        <a href=tel:'+1-(123)-555-1235'>
                                <img alt='tel:+1-(123)-555-1235'
                                src='http://www.sigbop.com/Images/Buttons/HOMEPHONE.png' border='0' height='32'
                                width='32' style='padding-right:3px;' >
                        </a>
                </td>
                <td>
                        <a href=tel:'+1-(123)-555-1236'>
                                <img alt='tel:+1-(123)-555-1236'
                                src='http://www.sigbop.com/Images/Buttons/CELLPHONE.png' border='0' height='32'
                                width='32' style='padding-right:3px;' >
                        </a>
                </td>
                <td>
                        <a href=tel:'+1-(123)-555-1237'>
                                <img alt='tel:+1-(123)-555-1237'
                                src='http://www.sigbop.com/Images/Buttons/PRIMARYFAXPHONE.png' border='0'
                                height='32' width='32' style='padding-right:3px;' >
                        </a>
                </td>
                <td>
                        <a href='http://www.sigbop.com/Redirect.aspx?ButtonId=351795a3-6315-4386-8d41-
                        9d989e70f7d6'>
                                <img alt='Facebook' src='http://www.sigbop.com/Images/Buttons/facebook.png'
                                border='0' height='32' width='32' style='padding-right:3px;'>
                        </a>
                </td>
        </tr>
</table>
```

FIG. 7

GRAPHIC-BASED ELECTRONIC SIGNATURE MANAGEMENT SYSTEM AND METHOD

FIELD OF THE INVENTION

The present invention relates to electronic communications and more particularly to electronic signatures for presenting contact information.

BACKGROUND

The means with which user of computing devices can communicate with each other continues to grow. Where individuals may once have been reached at one or two telephone numbers, users may presently be reached via, for example, multiple telephone numbers (e.g., home, work, and mobile), home and work fax numbers, multiple email addresses, personal and professional web pages, and various social networking profiles (e.g., Facebook, Twitter, etc.).

Given the amount of contact information individuals currently maintain, a need exists for a new approach to managing, organizing, and presenting the various ways individuals may be contacted.

SUMMARY

A computer-implemented system for managing an electronic signature is provided. A data collector receives one or more contact information items. A signature builder builds a graphic-based electronic signature based on at least one of the contact information items. The graphic-based electronic signature includes a set of icons. Individual icons in the set of icons are respectively associated with at least one of the contact information items. Individual icons in the set of icons are configured to initiate a communication application when one of the icons is selected in order to communication via the communication application using the contact information item associated with the selected icon.

A computer-implemented method for managing an electronic signature is also provided. One or more contact information items are received. A graphic-based electronic signature is built, and the graphic-based electronic signature corresponds to at least one of the contact information items. The graphic-based electronic signature may also include a set of icons. Individual icons in the set of icons are associated with respective contact information items. Individual icons in the set of icons are also configured to initiate a communication application when one of the icons is selected in order to communicate via the communication application using the contact information item associated with the selected icon.

A computer-implemented method of sponsoring an electronic signature is additionally provided. One or more third-party contact information items may be received. The third-party contact information items are respectively associated with a third-party icon. A set of third-party icon selections is also received. Individual selections in the set of third-party icon selections respectively correspond to third-party icons selected for inclusion in a graphic-based electronic signature. The graphic-based electronic signature is built, at least in part, based on the set of third-party icon selections.

A computer-implemented system for locally managing an electronic signature is further provided. A data collector may receive one or more contact information items. A signature builder builds a graphic-based electronic signature based on at least one of the contact information items. The graphic-based electronic signature may include a set of icons. Individual icons in the set of icons are respectively associated with at least one of the contact information items. Individual icons are also configured to initiate a communication application when one of the icons is selected in order to communicate via the communication application using the contact information item associated with the selected icon. Additionally the signature builder is configured to access signature-related information stored remotely relative to the signature builder.

BRIEF DESCRIPTION OF THE DRAWINGS

FIG. 3 is an example of an implementation of a web interface of a graphic-based electronic signature management system.

FIG. 7 is an example of an implementation of the graphic-based electronic signature of FIG. 6.

DETAILED DESCRIPTION

A system for building and managing a graphic-based electronic signature is provided. The graphic-based signature ("signature") includes one or more selectable icons that are each associated with a contact information item. A user may append the signature to an electronic communication, e.g., an email or web page. When the recipient views the electronic communication, the signature is displayed as an array of selectable icons. The recipient may select one of the icons in the signature to initiate a new electronic communication with the sender using the contact information associated with the selected icon or connect to other information associated with the icon. These features and additional features will be discussed in further detail below.

Graphic-Based Electronic Signature Management System

Figure 1:
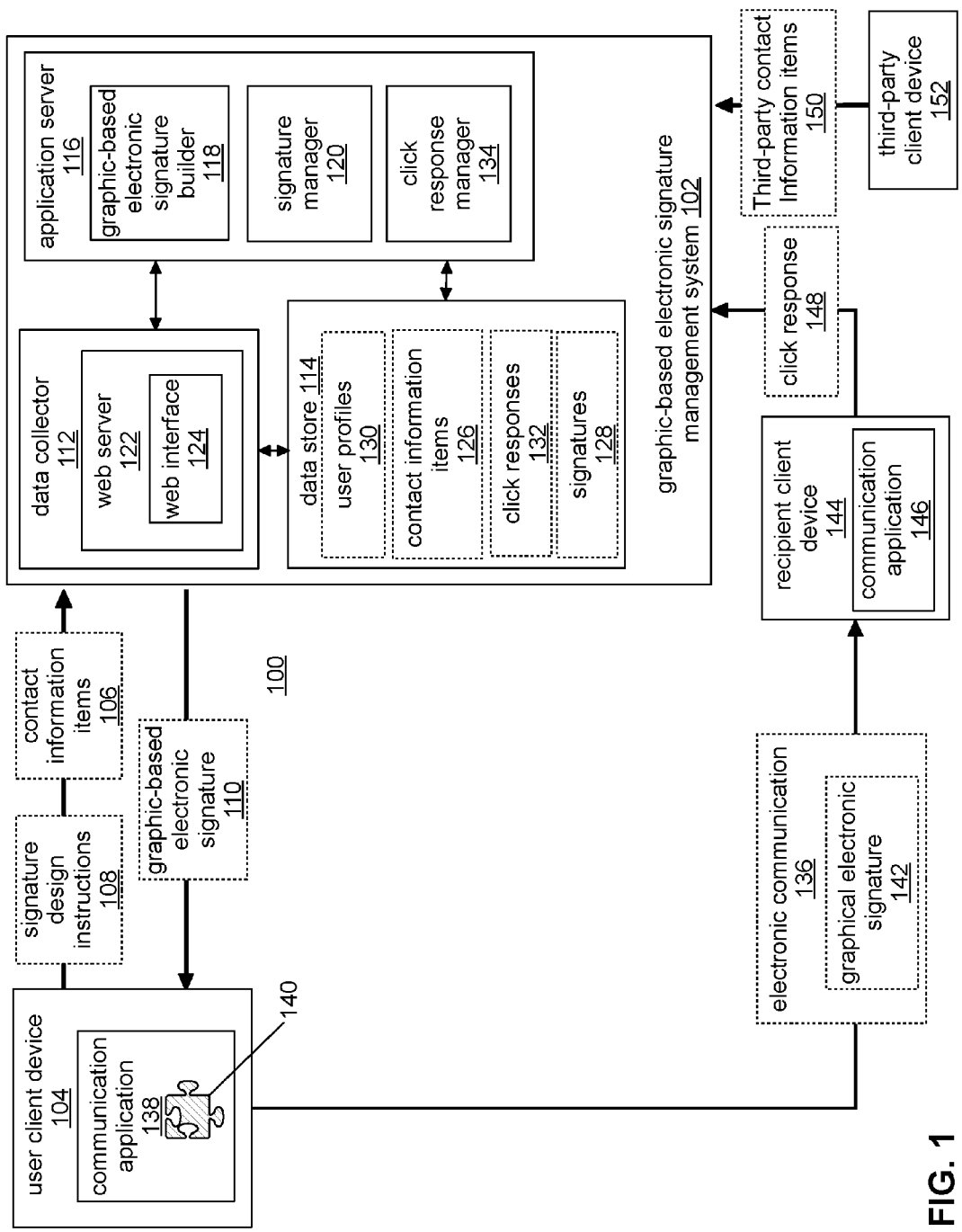
FIG. 1 is an example of an implementation of a graphic-based electronic signature management system.

Referring to FIG. 1, an example of an embodiment of a graphic-based electronic signature management system is shown. As seen in this example, the system may be in signal communication with a user client device. The system receives contact information items and signature design instructions from the user client device, and the system provides a graphic-based electronic signature that includes one or more of the contact information items back to the user client device. The system and user client device may communicate via a network such as, for example, a packet-based network, e.g., the Internet. Accordingly the system and user client device may communicate, for example, using an HTTP request/response exchange (HyperText Transfer Protocol). The system and user client device may also communicate via other types of networks such as, for example, cellular networks.

Contact information items include, for example, the following information about a user: first, middle, and last name; job title; company name; personal and professional mailing addresses; personal and professional email address; personal and professional phone numbers (e.g., home, work, and mobile); personal and professional facsimile numbers; personal and professional web pages; and various social networking profiles (e.g., Facebook, Twitter, Google+, Flickr, etc.). Various combinations of contact information items may be included in one or more graphic-based electronic signatures for a user. A graphic-based electronic signature may also include links to websites or data a creator may wish to share.

Signature design instructions relate to the construction of a graphic-based electronic signature. For example, a user may create multiple signatures using the graphic-based electronic signature management system, e.g., a personal signature containing personal contact information items and a professional signature containing professional contact information items. Signature design instructions may also specify which contact information items should be included in a signature as well as the order of contact information items included in a signature. Additionally signature design instructions may specify a particular icon (i.e., graphic or image) to associate with a contact information item.

The client devices may be any type of computing device that is able to be configured to communicate via a network, e.g. a packet-switched network such as the internet. Client devices may include, for example, desktop computers, laptop computers, tablet computers, palmtop computers, mobile telephones, videogame consoles, network-enabled televisions, and the like.

The system includes various components in signal communication with each other that facilitate the receipt of contact information items from the user client device and the construction and management of graphic-based electronic signatures. In this example, the system includes: a data collector for collecting the contact information items and signature design instructions from the user client device; a data store for storing signature-related information; and an application server that facilitates the construction and management of graphic-based electronic signatures. The components of the system may reside on a single computing device or distributed among multiple computing devices in signal communication with each other.

As seen in FIG. 1, the signature builder and signature manager reside remotely at the application server of the system. In an alternative embodiment, as shown by way of example in FIG. 2, the graphic-based signature builder and the signature manager may reside locally at the user client device as components of a local application. The local application, in this example, requests and receives signature information from the remote graphic-based electronic signature management system. The local application may present the signature information to the user via the local application, and the user may provide signature design instructions to locally construct a signature using the graphic-based signature builder of the local application. The user may also, for example, create, modify, or delete signatures locally using the signature manager of the local application. Contact information items and signatures are still stored remotely at the graphic-based electronic signature management system in this alternative example. Furthermore, the local application transmits signature management instructions corresponding to the creation, modification, and deletion of signatures locally via the local application. In response to receipt of the signature management instructions at the remote system, the application server updates the signature-related information stored at the data store based on the signature management instructions received. Because the data is collected locally via the local application, the remote system, in this example, does not include a combination web server/web interface, and instead just includes a web server to receive the signature management instructions from the local application.

Referring back to FIG. 1, the data collector, in this example, includes a web server and a web interface for exchanging communications with the user client device. A user at the user client device may interface with the graphic-based electronic signature management system via the web interface using, for example, a web browser (not shown). In response to commands or instructions received at the web browser from the user, the user client device may transmit requests, e.g. HTTP requests, to the system. The web server may receive the requests and forward the requests to the application server for processing. The application server may process the request, and the web server may generate a response, e.g., an HTTP response, and transmit the response back to the user client device.

The data store, in this example, stores signature-related information and other user-related information. Signature-related information includes the contact information items and the signatures constructed by a user. User-related information may include user profile information provided by a user when registering for access to the system, e.g., access credentials such as a username and password. The user may supply the access credentials to an authentication module (not shown) at the system to gain access to other component of the system. As discussed further below, the data store may also store click responses to track when a recipient selects one of the selectable icons in a graphic-based electronic signature. The data store may be, for example, a database stored on a computer memory, and the system may include a database management system (not shown) to facilitate the storage and retrieval of information stored in the database.

The application server facilitates the construction and management of graphic-based signatures based on the contact information items and signature design instructions received from the user via the user client device. Accordingly, the application server includes various modules to facilitate the construction and management of the signatures. The application server, in this example, includes a signature builder for constructing signatures and a signature manager for managing the signatures. Users may access the graphic-based signature builder and signature manager via, for example, the web interface. As discussed further below, the application server may also include a click response manager for tracking recipient selections of selectable icons of signatures received in electronic communications.

The signature manager enables a user to perform signature management-related tasks. Management-related tasks include, for example: creating a new signature; selecting a signature to modify; and deleting or archiving a signature. When creating a new signature, for example, the signature manager, in this example, creates a new signature record in the data store. When modifying a signature, the signature manager, in this example, retrieves the signature information for the existing signature from the data store. It is noted that, in some implementations, modifying a signature may result in the modification of previously sent signatures that access the data store. And when deleting a signature, the signature manager, in this example, deletes the record associated with the signature from the data store.

The signature builder, in this example, may construct a signature based on signature design instructions received from the user via the user client device. Construction of the graphic-based electronic signature may additionally or alternatively be automatic. The signature builder may include, for example, a set of default selectable icons in the signature under construction. Additional user-selected selectable icons may be added to the signature based on the signature design instructions received at the signature builder. As mentioned above, the signature builder facilitates the selection of contact information items to include in the signature under construction and the arrangement of the selectable icons in the signature under construction. A user may add contact information items to the signature, remove contact information items from the signature, or rearrange contact information items within the signature.

Figure 3:
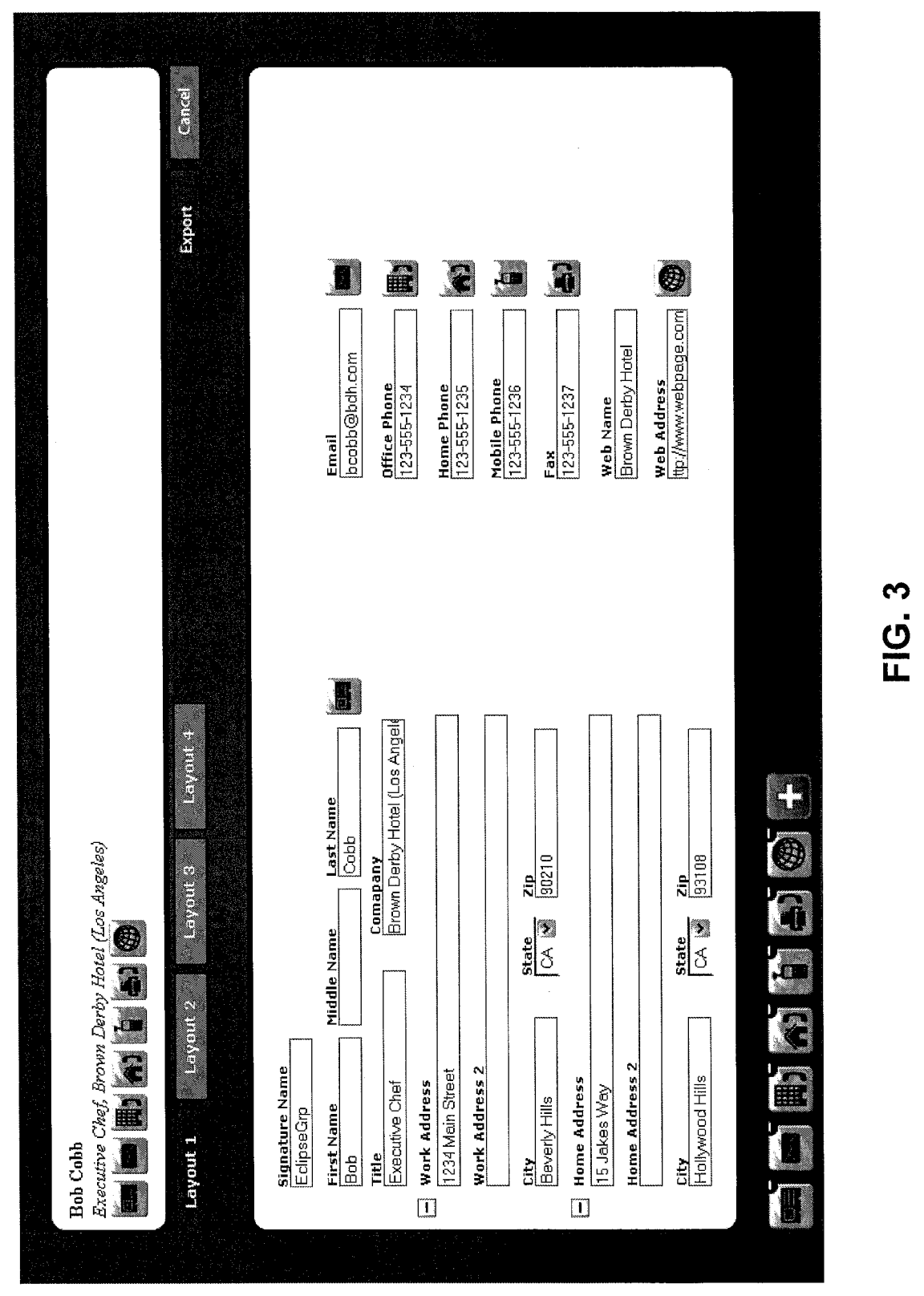

With additional reference to FIG. 3, an example of an implementation of a web interface for constructing a graphic-based electronic signature is shown. The signature builder receives signature design instructions as user input via the web interface. The web interface presents a web form having various input elements for collecting contact information from a user. The web form of the web interface, in this example, includes multiple text boxes respectively associated with one type of contact information, e.g., name, title, company, work address, home address, phone numbers, email address, mailing address, fax number, web page, and web page address.

The web interface, in this example, also includes a preview display of the signature under construction. In this example, the layout of the signature includes: a first line displaying the first and last name of the user; a second line displaying the title and company of the user; and a third line displaying the set of selectable icons respectively associated with the contact information items. As contact information items are added to the web form, the signature builder may automatically add to the signature under construction a selectable icon for the contact information item. The web interface, in this example, also includes a set of buttons for removing selectable icons from the signature under construction. In this way, the user may control what contact information items stored in the data store appear in the signature.

The web interface may also include buttons to modify the layout of the signature under construction. Signature layouts may, for example, apply different stylings to the text information of the signature under construction. For example, different layouts may apply different graphics or typefaces, text styles (e.g., bold, italic, oblique, etc.), and colors to the signature under construction. Layouts may also modify additional or alternative aspects of the signature under construction.

Figure 4:
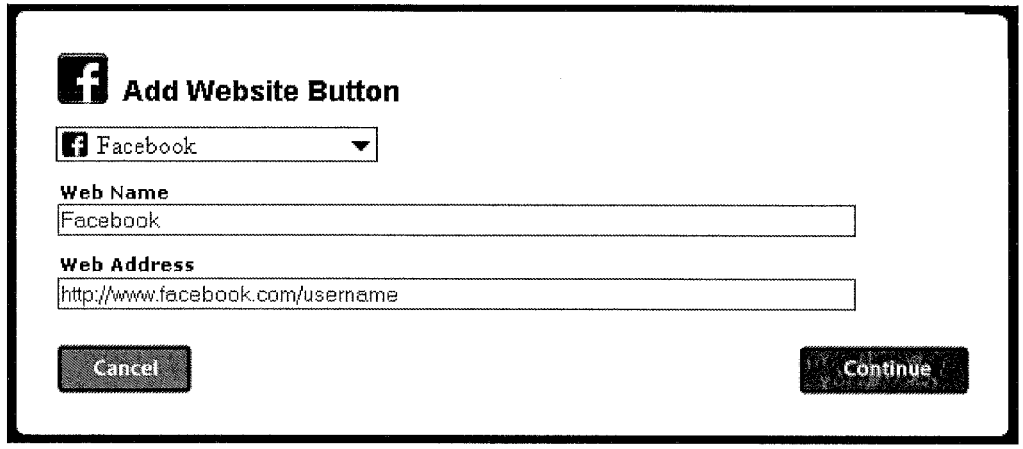
FIG. 4 is an example of an implementation of an input dialog of a web interface of a graphic-based electronic signature management system.

With reference to FIG. 3 and FIG. 4, the web interface, in this example, also includes a button to add additional web pages or links to the signature under construction. Upon selection of the button to add an additional web page, the web interface displays a dialog to collect information about the web page. As seen in FIG. 4, the dialog may include a drop-down list that includes a default set of additional web pages to add (e.g., Facebook, LinkedIn, Twitter, Skype, YouTube, Blogger, etc.). If the user selects one of the default additional webpages, the favorites icon for the webpage may be used as the image file for the selectable icon in the signature under construction. In the example dialog shown in FIG. 4, Facebook has been selected, and the Facebook icon is used as the image file for the selectable icon. A user may alternatively select to specify a non-default webpage. The dialog, in this example, includes textboxes to receive the name of the webpage and the webpage address. Once a user has input the webpage information, the user may select the "Continue" button and the signature builder adds a selectable icon for the web page to the signature under construction.

When a user is finished creating or modifying a signature, the user may save the signature to the data store by selecting a save button (not shown). Once a signature is saved, the user may export the signature from the graphic-based electronic signature management system for use in electronic communications such as, for example, email messages.

Figure 5:
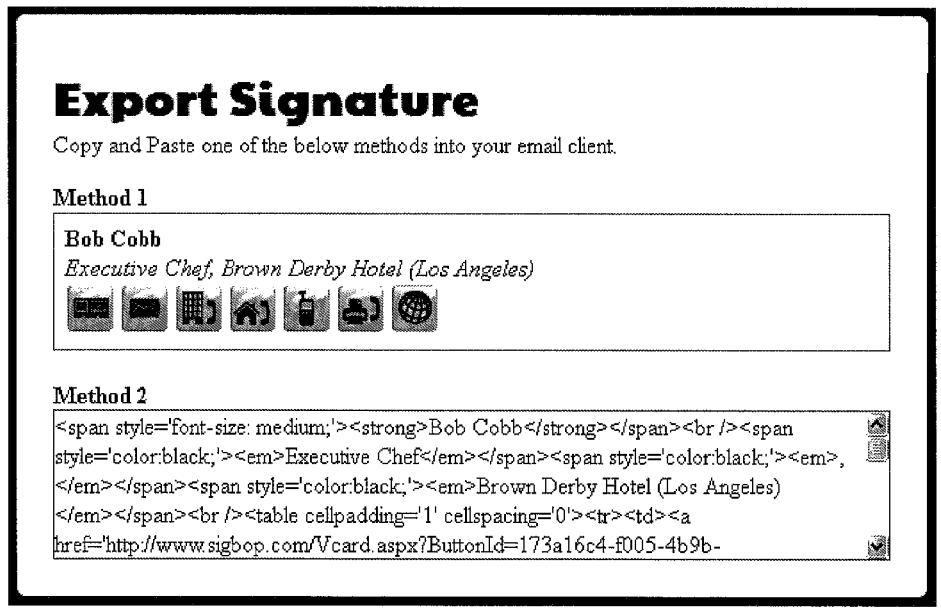
FIG. 5 is an example of an implementation of an export dialog of a web interface of a graphic-based signature management system.

Referring to FIG. 1, FIG. 3, and FIG. 5, the web interface displays an export dialog in response to selection of an export button. In this example, the export dialog presents the signature in two different formats. According to the first format, the graphic-based electronic signature is presented the same as the signature under construction in the preview display of FIG. 3. In this example, the first format presents the signature as two lines of text for the name, title, and company of the user, and a third line that includes the set of selectable icons respectively associated with the contact information items. According to the second format, the graphic-based electronic signature is presented as a set of markup data. This second signature format will be discussed in further detail below with reference to FIG. 7.

Regardless of the format selected, the user may copy (e.g., "copy-and-paste") the graphic-based electronic signature and save the signature to a local memory (not shown) at the user client device. Referring back to FIG. 1, the graphic-based electronic signature is thus available to be inserted into (i.e., pasted into, appended to, etc.) an electronic communication such as, for example, an email or webpage. In some example implementations, a user may manually copy-and-paste the signature into an electronic communication. Additionally or alternatively, the graphic-based electronic signature management system may include an insertion module that resides at the user client device and that is in signal communication with the communication application that generates the electronic communication. The insertion module may be, for example, an "extension" or "plug-in" that inserts the graphic-based electronic signature into an electronic communication. The insertion module may be configured to insert the signature automatically in response to the creation of an electronic communication or on-demand in response to receipt of an insertion command received at the user client device as user input.

Figure 8:
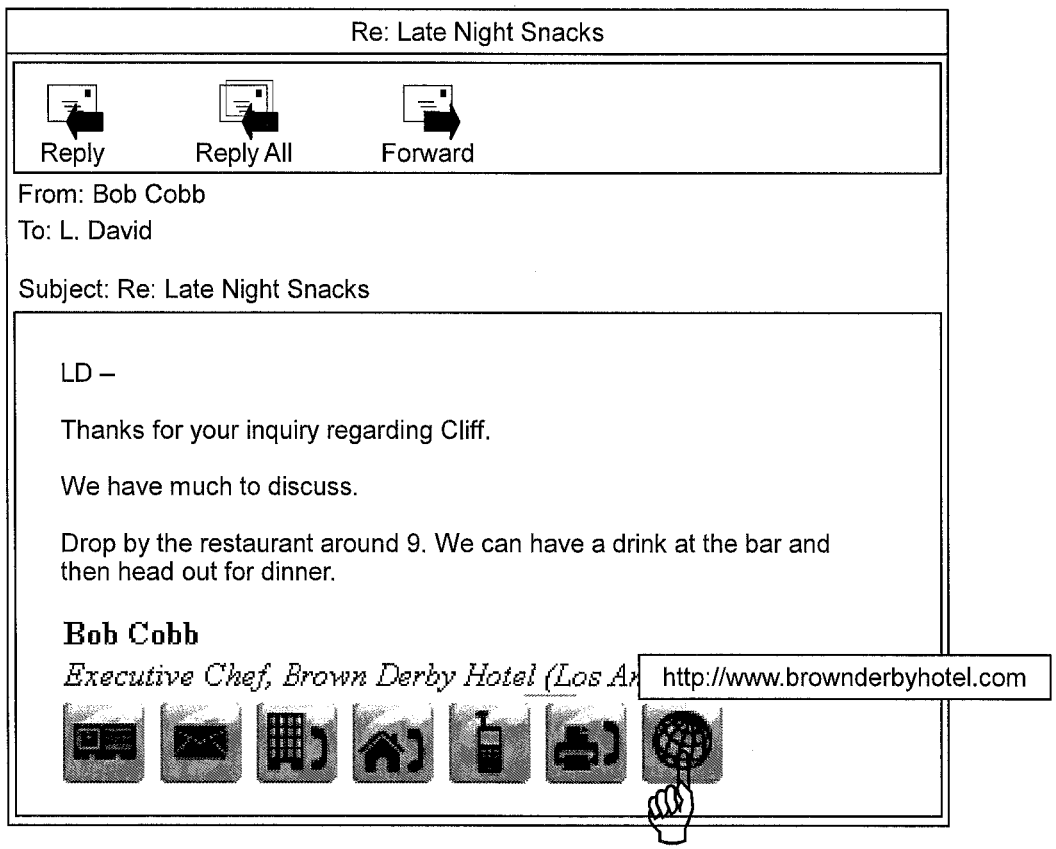
FIG. 8 is an example of an electronic communication that includes the example graphic-based electronic signature of FIG. 6.

With reference to FIG. 8, the user client device may then transmit the electronic communication to a recipient client device via a network, e.g., the Internet. The recipient client device may also include a communication application (e.g., an email client, web browser, etc.) configured to display the electronic communication to a recipient at the recipient client device. The graphic-based electronic signature is also presented to the recipient upon display of the electronic communication. As discussed below, the signature is displayed as an array of selectable icons with each icon respectively associated with a contact information item. The recipient may hover a cursor over an icon to display the contact information associated with that icon in a popup dialog. The recipient may also select an icon to initiate an electronic communication using the contact information associated with the icon.

Graphic-Based Electronic Signature

Each contact information item included in the graphic-based electronic signature is displayed as a selectable icon. With continued reference to FIG. 1, the data store may store image files used for the selectable icons in the signature. Suitable image file formats include, for example, PNG (Portable Network Graphics), GIF (Graphics Interchange Format), JPEG (Joint Photographic Experts Group), and the like. The image files may, for example, have dimensions of 32 pixels by 32 pixels. Additional or alternative dimensions may be selectively employed.

The signature builder may initially use a respective default image file for the selectable icons associated with contact information items of the signature. The image files of the selectable icons may indicate the type of contact information item the selectable icon is associated with. For example, an image of a telephone may indicate the contact information item is associated with a telephone number; and image of an envelope may indicate the contact information item is associated with an email address; and an image of a globe may indicate the contact information item is associated with a webpage address.

Users may also choose to use a user-selected image file for a selectable icon associated with a contact information item. For example, the user may upload an image file for remote storage at the data store and associate with user-selected image file with a selectable icon of a contact information item in the signature. Where the contract information item is a webpage address, the user may instruct the signature builder to use the favorites icon associated with the webpage address (i.e., "favicon," shortcut icon, bookmark icon, etc.). The system may transmit a request for the favorites icon to the web server that hosts the webpage. Upon receipt of the favorites icon at the system, the system may store the favorites icon in the data store for use in the signature under construction. Alternatively, the data store may store a reference to the favorites icon stored at the web server for the webpage.

The data store stores image files using a filename associated with the image file, e.g., PRIMARYEMAIL.PNG, PRIMARYFAX.PNG, WORKPHONE.PNG, etc. The graphic-based electronic signature, in this example, includes a reference to the image file stored remotely at the data store. If a user desires to change the image file for a selectable icon in an existing signature, the user may simply change the image file associated with the filename. For example, the user may upload a new image file having the same filename; the old image file will be replaced or archived at the data store, and signatures that reference the filename will display the new image associated with the filename. Similarly data associated with the icon may be replaced or archived. In this way, users may update the image file for a selectable icon, and the most up-to-date image file will be displayed upon viewing an electronic communications—even upon viewing previously transmitted electronic communications.

Figure 6:
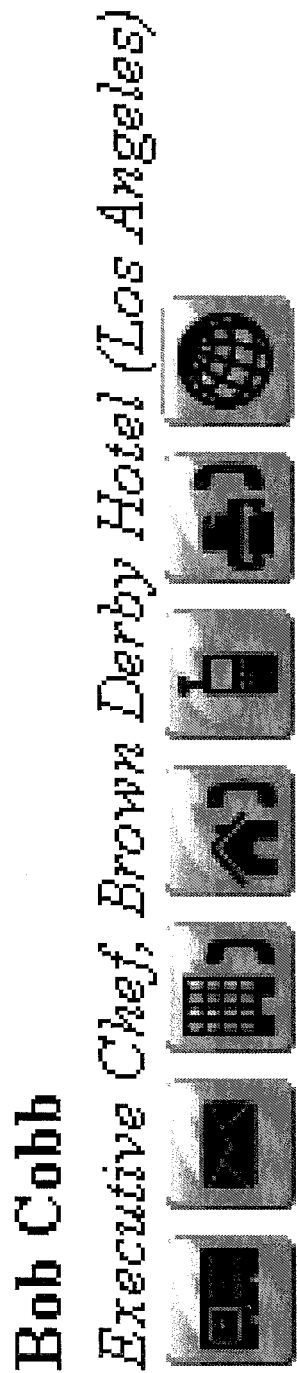
FIG. 6 is an example of a graphic-based electronic signature.

With additional reference to FIG. 6, an example of a graphic-based electronic signature is shown. The graphic-based electronic signature in FIG. 6 corresponds to the signature under construction in FIG. 3 above. The graphic-based electronic signature includes an array of one or more selectable icons. The signature in this example also includes the name, title, and company of the user above the array of selectable icons as previously shown in FIG. 3. Each selectable icon, in this example, is associated with a different contact information item. In the example signature shown in FIG. 6, the graphic-based electronic signature includes selectable icons for: an electronic business card (i.e., vCard), an email address; a work telephone number; a home telephone number; a mobile telephone number; a fax number; and a webpage address.

As mentioned above, the icons of the graphic-based electronic signature are selectable. Selecting one of the selectable icons in the signature may initiate an electronic communication using the contact information associated with the selectable icon (e.g., an email address, telephone number, webpage, etc.) via a communication application that corresponds to the type of contact information for the selected icon (e.g., an email client, telephone application, or web browser). To initiate an electronic communication, the signature may include a URI scheme (Uniform Resource Identifier) with the contact information. For an email address, for example, the signature may include, "mailto:email@address.com"; for a telephone number, "tel:+1-(123)-555-1234"; and for a webpage, "http://www.webpage.com". Accordingly when a recipient selects, i.e., "clicks," one of the selectable icons, a communication application is initiated based on the URI scheme associated with the contact information item of the selected icon. The recipient may then transmit an electronic communication via the communication application using the contact information of the selected icon.

Once a user has constructed a graphic-based electronic signature, signature-related information for the signature may be stored at the data store. Signature-related information for the signature may include, for example: a unique identifier for the signature; a unique identifier for each of the selectable icons included in a signature; information that specifies which contact information items are included in the signature; the image files associated with the selectable icons of the signature; and the arrangement of the selectable icons within the signature. The data store may also store additional or alternative types of signature-related information. The signature builder retrieves this signature-related information from the data store when a user selects to modify an existing signature.

The graphic-based electronic signature may be implemented, for example, as a set of markup data using a markup language such as, e.g., XML (eXtensible Markup Language) or HTML (HyperText Markup Language). Additional or alternative approaches to implementing the graphic-based electronic signature may be selectively employed.

Referring to FIG. 7, an example of an implementation of a graphic-based electronic signature is shown. The graphic-based electronic signature, in this example, is implemented using HTML. As seen in the example signature shown in FIG. 7, the signature includes an array of selectable icons and respectively associated contact information items. The signature, in this example, also includes a URI scheme (e.g., mailto:, tel:, and http:) respectively associated with each contact information item for initiating a communication using the contact information item.

The selectable icons include a reference to the associated image file stored remotely at the system. The selectable icons, in this example, also include an "alt" tag (alternative text) that specifies the contact information associated with the selectable icon. In this way, the contact information may be rendered as a tooltip when a cursor (e.g., mouse pointer) hovers over the selectable icon.

For a selectable icon relating to a webpage ("webpage icon"), the webpage address may be included in the graphic-based electronic signature. When a recipient selects a webpage icon, a web browser may transmit a request for the webpage specified by the webpage address associated with the webpage icon. Alternatively, however, the signature may include a reference to a webpage address stored remotely at the graphic-based electronic management system as shown by way of example in the signature of FIG. 7. In this alternative approach, the data store may store an association between a webpage icon and the webpage address for the webpage icon. When a recipient selects the selectable icon for a webpage in this alternative approach, a web browser may transmit a request to the graphic-based electronic signature management system, and the request may include the unique identifier (e.g., "ButtonId") for the webpage icon. Upon receipt of the request, the system performs a lookup in the data store based on the unique identifier for the webpage icon and determines the webpage address associated with the webpage icon. The system then sends a response to the web browser that redirects the web browser to the webpage address associated with the webpage icon. In this way, the system may track webpage click responses and keep older data updated with new information.

As mentioned above, the graphic-based electronic signature, in this example, includes references to the image files stored remotely at the data store. Accordingly, the communication application at the recipient client device may request the image file associated with a selectable icon whenever the electronic communication is displayed at the recipient client device. When the communication application displays the electronic communication, the communication application interprets the contents of the electronic communication, which includes, in this example, the graphic-based electronic signature and accompanying image file references. The communication application generates a request (e.g., an HTTP request), for an image file and transmits the request to the graphic-based electronic signature management system. In response to receipt of the request, the system may transmit a response (e.g., an HTTP response) that includes the requested image file. Because the communication application, in this example, interprets the electronic communication and requests the image files upon each display of the electronic communication, the signature may reflect changes to the signature after the recipient received the electronic communication. If a user changes the icon associated with one of the selectable icons, for example, the system transmits the most up-to-date icon to the recipient client device. The signature displayed may also reflect changes where a user removes a contact information item and selectable icon from a signature. When a user removes a selectable icon and contact information item from a signature, the system will not transmit a response to the recipient client device that contains an image file for the removed selectable icon. Because there is no image file to display, the graphic-based electronic signature will not include a selectable icon and the accompanying contact information for the removed selectable icon.

As an example, consider a graphic-based electronic signature that includes selectable icons for a webpage and a mobile telephone number. The selectable icon for the webpage, in this example, is associated with a default webpage icon. A user transmits an electronic communication to a recipient that includes the example signature. When the recipient client device displays the electronic communication, the signature includes selectable icons for the webpage and the mobile telephone number. The communication application at the recipient client device transmits requests for the image files associated with the selectable icons for the webpage and mobile telephone number. The graphic-based electronic signature management system transmits the requested icons in response, including the default webpage image file for the webpage icon. Consider now that the user subsequently changes the example signature to remove the mobile telephone number and to use the favorites icon for the webpage icon rather than a default webpage image file. When the recipient client device displays the example signature subsequent to the changes, the recipient client device, in this example, again transmits requests for the image files associated with the webpage icon and the mobile telephone icon. Due to the changes, however, the system transmits one response that includes the new favorites icon for the webpage and one response that does not include an image file for the mobile telephone number. Accordingly the example signature displays the favorites icon for the webpage icon. Additionally the example signature does not display a selectable icon for the mobile telephone number and by extension does not display the contact information for the mobile telephone number since the recipient client device did not receive an image file for the mobile telephone number icon. In some example implementations, if additional icons or links are added to a signature after it has been transmitted, the signature may be updated. The updating may occur when the management system responds to recipient client device.

Click Responses

As mentioned above, the graphic-based electronic signature management system may be configured to track selections of webpage icons or links at a recipient client device. Still referring to FIG. 1, the communication application (e.g., a web browser) at the recipient client device may transmit a request (e.g., an HTTP request) to the graphic-based electronic signature management system upon selection of a webpage icon or link. The request may include a unique identifier that identifies the webpage icon or link selected. These requests may be referred to, in this example, as click responses. The application server of the system may include a click response manager that receives the click responses.

In response to receipt of a click response, the click response manager may update a record in the data store that indicates the number of times the selected web page icon or link has been selected. The record that tracks the number of click responses may be, in this example, associated with the record for the webpage icon or link stored at the data store. The click response manager may also perform a lookup in the data store for the webpage address associated with the selected web page icon or link. The click response manager may then generate a response that includes the webpage address for the selected webpage icon or link and transmit the response back to the recipient client device such that the communication application is redirected to the webpage address for the selected webpage icon or link included in the response. In this way, the system may advantageously keep track of how many times a recipient selects a webpage icon or link of a graphic-based electronic signature.

Signature Sponsorships

The graphic-based electronic management system may also be configured to receive third-party contact information items from third parties via third-party client devices. The third-party contact information items may be similarly associated with third-party selectable icons as discussed above. When creating a graphic-based electronic signature, users may select to include one or more of the third-party contact information items in a signature under construction. The third-party contact information items may include, for example, webpage addresses designed to drive to drive traffic to third-party websites.

The graphic-based electronic signature management system may track the selections of the third-party selectable icons included in the signature of a user as discussed above. The third-party may compensate the user based on the number of selections of third-party selectable icons included in a signature of the user. In this way, the system advantageously creates incentives for third parties to sponsor graphic-based electronic signatures in order to drive traffic to third party websites and links. The system also advantageously creates incentives for users to include third-party contact information items in the signatures by compensating users when recipients select the third-party selectable icons. The graphic-based electronic management system may also be configured to replace the third-party contact information items. The replacement may be manual or automatic such as, for example, when a sponsor is terminated.

Graphic-Based Electronic Signature Management Method

Figure 9:
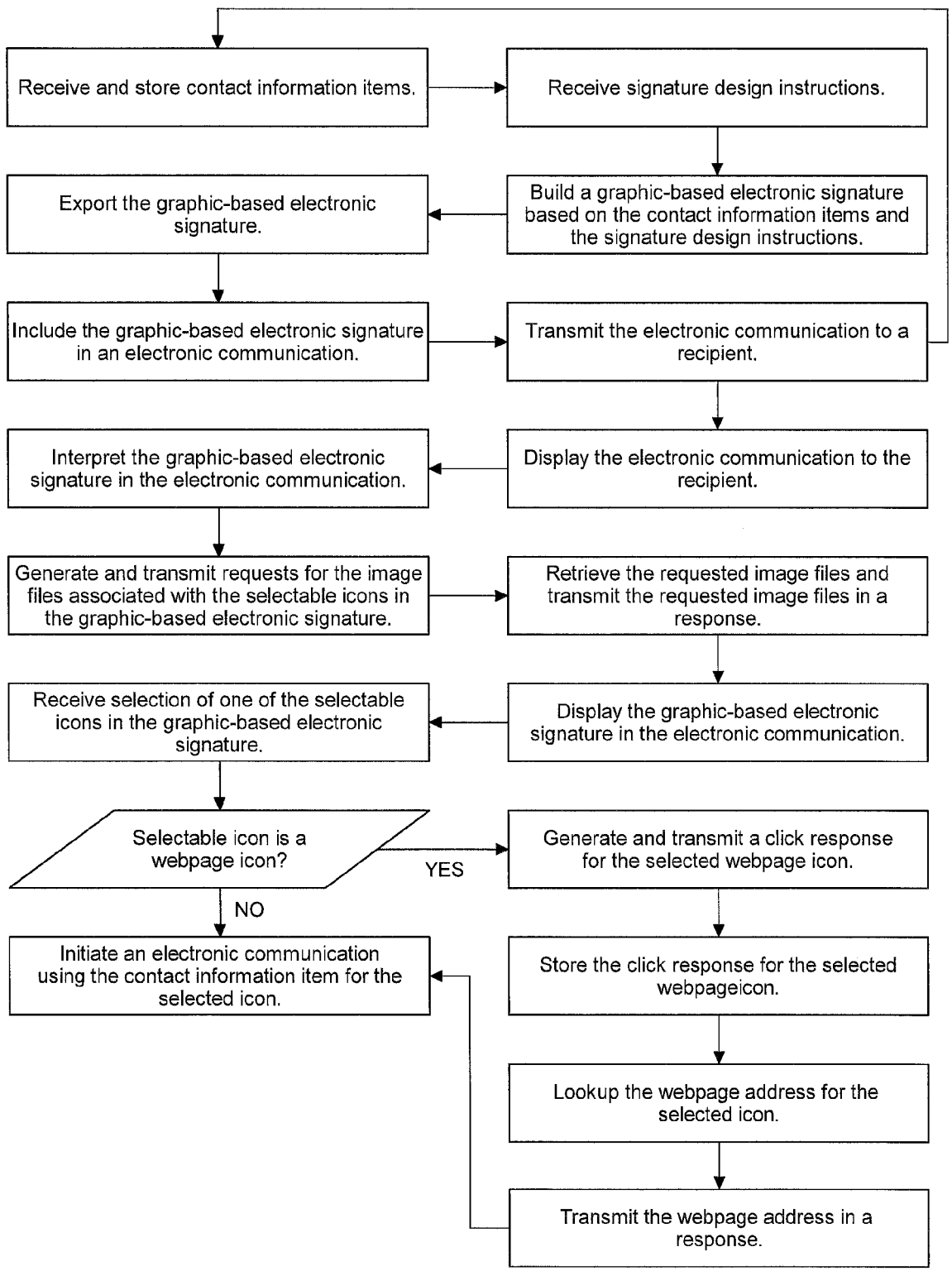
FIG. 9 is a flowchart of example method steps for managing a graphic-based electronic signature.

Referring now to FIG. 9, a flow diagram 900 of example steps for managing a graphic-based electronic signature is shown. As seen in FIG. 9, contact information items are received and may be stored at a data store (step 902). Signature design instructions are also received (step 904). A graphic-based electronic signature is built based on the contact information items and the signature design instructions (step 906). As discussed above, the graphic-based electronic signature includes one or more selectable icons that are respectively associated with a contact information item. A graphic-based electronic signature may include one or more default selectable icons, one or more user-selected selectable icons, one or more third-party selectable icons, or a combination of default icons, user-selected icons, and third party icons.

Once a graphic-based electronic signature has been built, the signature is exported (step 908) and may be included in an electronic communication (step 910), e.g., an email or webpage. The electronic communication that includes the graphic-based electronic signature may be transmitted to a recipient client device (step 912). The electronic communication may be displayed to the recipient using a communication application (e.g., an email client, web browser, etc.) at the recipient client device (step 914).

When the communication application at the recipient client device displays the electronic communication, the communication application interprets the graphic-based electronic signature (step 916). The communication application generates and transmits requests for the image files respectively associated with the selectable icons in the graphic-based electronic signature (step 918). In response to receipt of the requests, the requested image files are retrieved and transmitted back to the communication application in a response (step 920). The communication application then displays the graphic-based electronic signature as an array of selectable icons (step 922).

The recipient may then select one of the selectable icons in the graphic-based electronic signature (step 924). If the selected icon is a webpage icon (step 926), then, in this example, a click response is generated and transmitted to track the selection of the selected webpage icon (step 928). The click response is stored (step 930), and a lookup is performed to determine the webpage address for the selected webpage icon. (step 932). The webpage address for the webpage icon is transmitted back in a response (step 934), and an electronic communication using the webpage address may be initiated (step 936).

Figure 10:
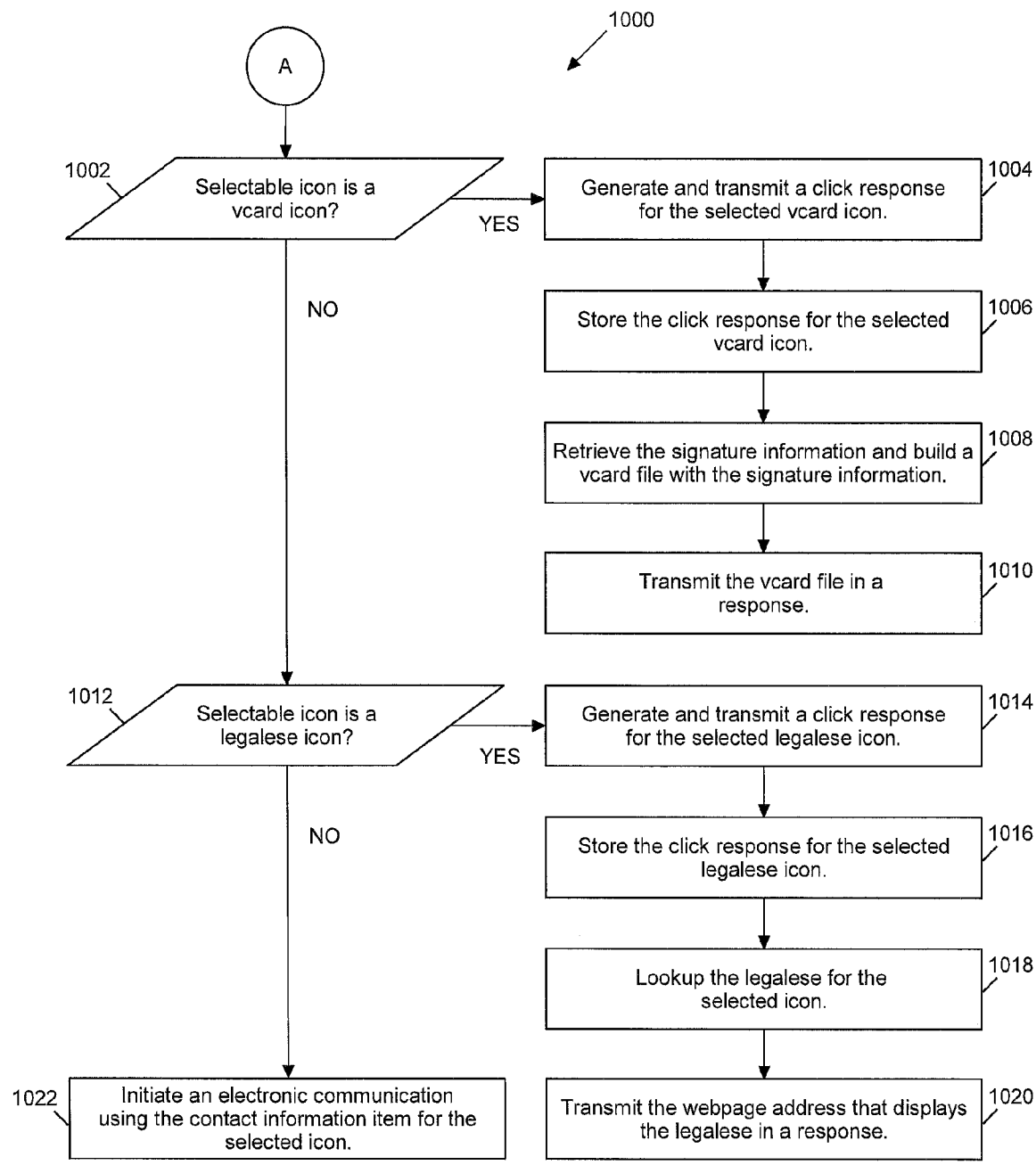
FIG. 10 is a continuation of the flowchart of FIG. 9.

FIG. 10 is a flow diagram of example steps for managing a graphic-based electronic signature when the selectable icon is not a webpage icon. If the selected icon is not a web page icon (step 926 in FIG. 9), then, in this example, whether the selectable icon is vcard icon or a legalese icon is determined.

If the selectable icon is a vcard icon (step 1002), then a click response is generated and transmitted for the vcard icon as discussed above (step 1004). The click response for the vcard icon is stored as discussed above (step 1006). The signature information for the signature associated with the vcard icon is retrieved to build a vcard file (step 1008), and the vcard file is transmitted back to the user that selected the vcard icon in a response (step 1010).

If the selectable icon is a legalese icon (step 1012), then a click response is generated and transmitted for the legalese icon (step 1014) as discussed above. The click response for the legalese icon is also stored as discussed above (step 1016). The legalese for the legalese icon is retrieved (step 1018), and a webpage address that displays the legalese is transmitted back to the user that selected the legalese icon in a response (step 1020).

If the selectable icon is not a webpage icon, yard icon, or legalese icon, then the selectable icon, in this example, is a contact information icon, and an electronic communication using the contact information item associated with the selectable icon is initiated (step 1022).

Additional Technical Details

The electronic signature may also contain information associated with validating the signature as being supplied by a trusted provider. In other implementations, the electronic signature may contain information such as a recommendation value that is associated with a number of people recommending the person or service provided by the person. The recommendations may be collected by a user selecting a "Like" button in the signature. In yet, other implementations additional value added information may be included in the electronic signature such as type of sender information (friend, co-worker, solicitation, etc. . . . ).

It will be understood and appreciated that one or more of the processes, sub-processes, and process steps described in connection with FIGS. 1-9 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIGS. 1-5, 7, and 9. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

Figure 2:
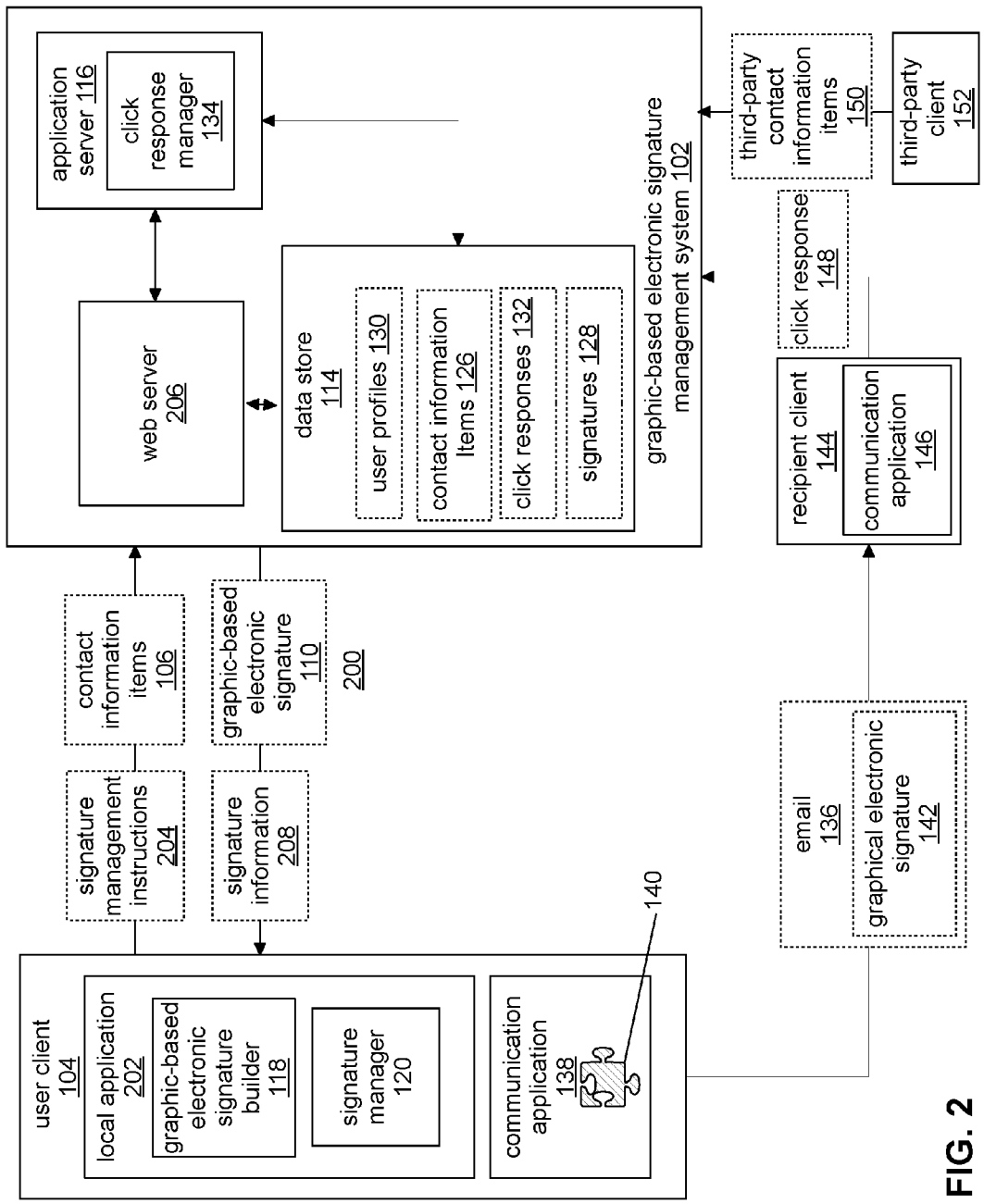
FIG. 2 is another example of an implementation of a graphic-based electronic signature management system.

The executable instructions may be implemented as a computer program product having instructions stored therein which, when executed by a processing module of an electronic system (e.g., a graphic-based electronic signature management system in FIGS. 1-2), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program may be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electro-chemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A computer-implemented system having a processor for managing an electronic signature comprising:
    a data collector implemented with the processor that receives one or more information items;
    a signature builder that builds a graphic-based electronic signature based on at least one of the information items that are stored remotely, the graphic-based electronic signature includes a set of icons wherein individual icons in the set of icons are respectively associated with at least one of the information items and the signature builder provides a link to the graphic-based electronic signature that is used as a signature where the graphical-based electronic signature is stored remotely in a network and accessed by the link; and
    wherein the individual icons in the set of icons are configured to initiate a communication application when one of the icons is selected in order to communicate via the communication application using the information item associated with the selected icon and the signature builder configures the individual icons in the set of icons of the graphic-based electronic signature to trigger a selection indication when the one of the icons is selected, the selection indication includes identifying information relating to the selected icon, wherein the communication application transmits a click response request to a click response manager upon the selection of the one of the icons and wherein, in response to receipt of the click response request, the click response manager generates a web response based upon the selected one of the icons to be interpreted by the communication application and transmits the response back to a recipient client device; and
    wherein a data store receives and stores the identifying information of the selection indication to provide a selection history that indicates which icons in the set of icons of the graphic-based electronic signature have been selected, the data store further stores click responses to track when a recipient selects the one of the icons in the graphic-based electronic signature and, when one icon in the set of icons is selected, the data store updates a record that indicates a number of times the one of the icons has been selected.

2. The computer-implemented system of claim 1 wherein the set of icons of the graphic-based electronic signature includes at least one icon that is included in the set of icons based on a user-selection.

3. The computer-implemented system of claim 2 wherein:
    the data collector receives one or more third-party information items;
    the third-party information items are respectively associated with a set of third-party icons; and
    the at least one icon included in the graphic-based electronic signature based on the user-selection is selected from the set of third-party icons.

4. The computer-implemented system of claim 1 wherein the link associated with the graphic-based electronic signature is included in an electronic communication in response to receipt of user input.

5. The computer-implemented system of claim 4 further comprising an insertion module in signal communication with the communication application such that the insertion module includes the graphic-based electronic signature accessed by the link in the electronic communication in response to receipt of user input at the communication application.

6. The computer-implemented system of claim 5 wherein:
    the communication application is an email application;
    the electronic communication is an email; and
    individual icons in the set of icons of the graphic-based electronic signature are displayed adjacent to one another when the graphic-based electronic signature accessed by the link is included in the email.

7. The computer-implemented system of claim 1 wherein the data collector receives one or more updated contact information items from the user and further comprising:
    a graphic-based electronic signature manager that associates the one or more updated information items with respective individual icons in the set of icons of the graphic-based electronic signature such that the graphic-based electronic signature includes the one or more updated contact information items when the graphic-based electronic signature is presented via the link in an electronic communication.

8. The computer-implemented system of claim 1 wherein the signature builder configures at least one of the icons in the set of icons of the graphic-based electronic signature to display the information item associated with the icon in a pop-up dialog when a cursor hovers over the icon.

9. The computer-implemented system of claim 1 wherein the set of icons of the graphic-based signature includes respective icons for at least a telephone contact information item, an email contact information item, a webpage contact information item, and a social networking information item.

10. A computer-implemented method for managing an electronic signature comprising:
receiving one or more information items that are stored remotely;
building a graphic-based electronic signature corresponding to at least one of the contact information items, the graphic-based electronic signature includes a set of icons, where the set of graphical-based electronic signature is stored remotely in a network and accessed by a link that is associated with the graphic-based electronic signature;
associating individual icons in the set of icons with respective information items;
configuring the individual icons in the set of icons to initiate a communication application when one of the icons is selected in order to communicate via the communication application using the contact information item associated with the selected icon and configuring the individual icons in the set of icons of the graphic-based electronic signature to trigger a selection indication when the one of the icons is selected, the selection indication includes identifying information relating to the selected icon, wherein the communication application transmits a click response request to a click response manager upon the selection of the one of the icons and wherein, in response to receipt of the click response request, the click response manager generates a web response based upon the selected one of the icons to be interpreted by the communication application and transmits the response back to a recipient client device; and
wherein a data store receives and stores the identifying information of the selection indication to provide a selection history that indicates which icons in the set of icons of the graphic-based electronic signature have been selected, the data store further stores click responses to track when a recipient selects the one of the icons in the graphic-based electronic signature and, when one icon in the set of icons is selected, the data store updates a record that indicates a number of times the one of the icons has been selected.

11. The computer-implemented method of claim 10 further comprising including at least one icon in the set of icons of the graphic-based electronic signature based on a user-selection.

12. The computer-implemented method of claim 11 further comprising:
receiving one or more third-party information items from a third-party;
respectively associating the third-party information items with a set of third-party icons; and
wherein the at least one icon included in the graphic-based electronic signature based on the user-selection is selected from the set of third-party icons.

13. The computer-implemented method of claim 10 wherein the graphic-based electronic signature accessed by the link is included in an electronic communication in response to receipt of user input.

14. The computer-implemented method of claim 13 further comprising extending functionality of a communication application such that the graphic-based electronic signature is included via the link in response to receipt of user input at the communication application.

15. The computer-implemented method of claim 14 wherein:
the communication is an email application;
the electronic communication is an email; and
individual icons in the set of icons of the graphic-based electronic signature are displayed adjacent to one another when the graphic-based electronic signature is displayed in the email.

16. The computer-implemented method of claim 10 further comprising:
receiving one or more updated information items; and
associating the one or more updated information items with respective individual icons in the set of icons of the graphic-based electronic signature such that the graphic-based electronic signature includes the one or more updated information items when the graphic-based electronic signature is displayed in an electronic communication.

17. The computer-implemented method of claim 10 further comprising configuring at least one of the icons in the set of icons of the graphic-based electronic signature to display the information item associated with the icon in a pop-up dialog when a cursor hovers over the icon.

18. The computer-implemented method of claim 10 wherein the set of icons of the graphic-based signature includes respective icons for at least a telephone contact information item, an email contact information item, a webpage contact information item, and a social networking information item.

19. A computer-implemented method controlled by a processor of sponsoring an electronic signature of an electronic communication comprising:
receiving one or more third-party information items that reside remotely, the third-party contact information items are respectively associated with a third-party icon by the processor;
receiving a set of third-party icon selections, individual selections in the set of third-party icon selections respectively correspond to third-party icons selected for inclusion in a graphic-based electronic signature and where the graphical-based electronic signature is stored remotely in a network accessed by a link that is associated with the graphical-based electronic signature; and
building the graphic-based electronic signature based at least in part on the set of third-party icon selections;
wherein the graphic-based electronic signature respectively includes the third-party icons indicated in the set of third-party icon selections such that the third-party icons indicate a sponsorship of the graphic-based electronic signature by a third party when the graphic-based electronic signature is displayed; wherein a signature builder configures individual icons in the set of third-party icon selections of the graphic-based electronic signature to trigger a selection indication when one of the third-party icons is selected, the selection indication includes identifying information relating to the selected third-party icon, wherein a communication application transmits a click response request to a click response manager upon the selection of the one of the third-party icons and wherein, in response to receipt of the click response request, the click response manager generates a web response based upon the selected one of the third-party icons to be interpreted by the communication application and transmits the response back to a recipient client device; and wherein a data store receives and stores the identifying information of the selection indication to provide a selection history that indicates which icons in the set of the third-party icon selections of the graphic-based electronic signature have been selected, the data store further stores click responses to track when a recipient selects the one of the third-party icon selections in the graphic-based electronic signature and, when one icon in the set of the third-party icon selections is selected, the data store updates a record that indicates a number of times the one of the third-party icon selections has been selected.

20. A computer-implemented system comprising a processor for locally managing an electronic signature comprising:

a data collector that receives one or more contact information items;

a signature builder that builds a graphic-based electronic signature based on at least one of the information items that is stored remotely, the graphic-based electronic signature includes a set of icons wherein individual icons in the set of icons are respectively associated with at least one of the information items and the signature builder provides a link to the graphic-based electronic signature that is used as a signature where the graphical-based electronic signature is stored remotely in a network and accessed by the link;

wherein the individual icons in the set of icons are configured to initiate a communication application when one of the icons is selected in order to communicate via the communication application using the information item associated with the selected icon; wherein the signature builder configures the individual icons in the set of icons of the graphic-based electronic signature to trigger a selection indication when the one of the icons is selected, the selection indication includes identifying information relating to the selected icon, wherein the communication application transmits a click response request to a click response manager upon the selection of the one of the icons and wherein, in response to receipt of the click response request, the click response manager generates a web response based upon the selected one of the icons to be interpreted by the communication application and transmits the response back to a recipient client device;

wherein a data store receives and stores the identifying information of the selection indication to provide a selection history that indicates which icons in the set of icons of the graphic-based electronic signature have been selected, the data store further stores click responses to track when a recipient selects the one of the icons in the graphic-based electronic signature and, when one icon in the set of icons is selected, the data store updates a record that indicates a number of times the one of the icons has been selected; and wherein the signature builder is configured to access signature-related information stored remotely relative to the signature builder.

* * * * *